United States Patent [19]

Cassel

[11] 4,312,526

[45] Jan. 26, 1982

[54] PIPE COUPLING WITH OPEN SLEEVE

[76] Inventor: Thomas R. Cassel, 226 Shirley, Birmingham, Mich. 48009

[21] Appl. No.: 161,996

[22] Filed: Jun. 23, 1980

Related U.S. Application Data

[63] Continuation of Ser. No. 31,651, Apr. 19, 1979, abandoned.

[51] Int. Cl.³ .............................................. F16L 21/06
[52] U.S. Cl. ..................................... 285/419; 285/420
[58] Field of Search ................ 285/419, 420, 373, 417

[56] References Cited

U.S. PATENT DOCUMENTS

| 852,997 | 5/1907 | Brandram | 285/420 X |
| 2,908,061 | 10/1959 | Adams | 285/420 X |
| 3,565,468 | 2/1971 | Garrett | 285/373 |
| 3,905,623 | 9/1975 | Cassel | 285/417 X |
| 3,944,265 | 3/1976 | Hiemstra et al. | 285/419 |
| 4,056,273 | 11/1977 | Cassel | 285/420 X |
| 4,165,109 | 8/1979 | Foti | 285/420 X |

Primary Examiner—Thomas F. Callaghan
Attorney, Agent, or Firm—Reising, Ethington, Barnard, Perry & Brooks

[57] ABSTRACT

A pipe coupling is disclosed which comprises an open sleeve which is stretched around the pipes. The open sleeve comprises a roundish sector and a channel-shaped sector comprising a pair of sidewalls extending outwardly from the roundish sector. Force applying means are connected with the sidewalls to draw the sidewalls together and retaining means on the sidewalls are trapped by the force applying means so that the roundish portion of the sleeve is stretched over the pipes.

11 Claims, 5 Drawing Figures

PIPE COUPLING WITH OPEN SLEEVE

This is a continuation of application Ser. No. 031,651, filed Apr. 19, 1979, and now abandoned.

TECHNICAL FIELD

This invention relates to pipe couplings and more particularly it relates to a pipe coupling of the stretched sleeve type. The pipe coupling of this invention is an improvement upon my pipe couplings disclosed and claimed in U.S. Pat. No. 3,905,623 and U.S. Pat. No. 4,056,273.

There are many applications for pipe couplings where it is desired to couple two pipes together in a strong mechanical connection with a substantially fluid tight seal. An important use of such a coupling is that of joining two pipes in a vehicle exhaust system. In such an application ease of installation and removal, as well as cost, are of great importance. Because of the relatively high temperature and mechanical stresses which occur in vehicle exhaust systems, the coupling must be fabricated from a metal, such as a suitable grade of steel, to provide the requisite strength for a long period of service. In some applications, such as heavy duty truck exhaust systems, the coupling must join relatively large diameter pipes. In some cases, the pipes are joined in a telescoping relationship and in other cases they are joined together in a butt joint. One of the pipes may take the form of a flexible metal pipe while the other may take the form of a rigid pipe. Other uses for such couplings may include relatively small metal or plastic water pipes and relatively large drainage and sewage pipes of either plastic or clay material. Still other applications include joining of structural pipes, as in the case of scaffolds and the likes.

BACKGROUND ART

In my U.S. Pat. No. 3,905,623, a pipe coupling is disclosed in which a wide-band sleeve is stretched over adjoining pipe ends to provide a mechanical connection with a fluid seal between the pipes. In this patent, the coupling includes a sleeve having a roundish sector and a channel-shaped sector and force applying means connected with the channel-shaped sector is adapted to stretch the sleeve to form the joint. A pipe coupling which is similar but especially adapted for lap joints is shown in my U.S. Pat. No. 4,056,273. The couplings of my aforementioned patents utilize a closed sleeve which must be installed by putting one of the pipe ends through the sleeve.

U.S. Pat. No. 3,944,265 to Hiemstra, et al. discloses a pipe coupling which comprises a sheet metal band provided with reenforcing plates at each end with bolts extending through the plates to draw the plates together and stretch the band around the pipe ends. The sheet metal band of this coupling assumes the form of a flat strip or sheet prior to installation and must be wrapped around the pipe ends. The coupling of this patent has the disadvantage of stress distribution in the band which is highly non-uniform with a high degree of stress concentration in the vicinity of the reenforcing plate.

It is the general object of this invention to provide a pipe coupling having the advantages of a stretched wide-band sleeve and an open sleeve to facilitate installation on pipes which are already butted or telescoped together.

DISCLOSURE OF THE INVENTION

According to this invention, a pipe coupling is provided with an open sleeve which is stretched around the pipes with stress distribution in the roundish sector of the sleeve such that all portions thereof are drawn into close engagement with the pipes. This is accomplished by providing the sleeve with a channel-shaped sector comprising a pair of sidewalls extending outwardly from a roundish sector. The sidewalls are separated from each other at the outer ends to form an opening in the sleeve. The sidewalls are held against a spline therebetween by a pair of outboard bars and one or more threaded fasteners. Each sidewall has a support or retaining member at the outer edge. When the fasteners are tightened, the sidewalls are drawn into engagement with concave surfaces of the spline by mating convex surfaces on the bars and the retaining members are tapped while the sleeve is stretched around the pipes.

A more complete understanding of this invention may be obtained from the detailed description that follows taken with the accompanying drawings.

BEST MODE FOR CARRYING OUT THE INVENTION

Figure 1:
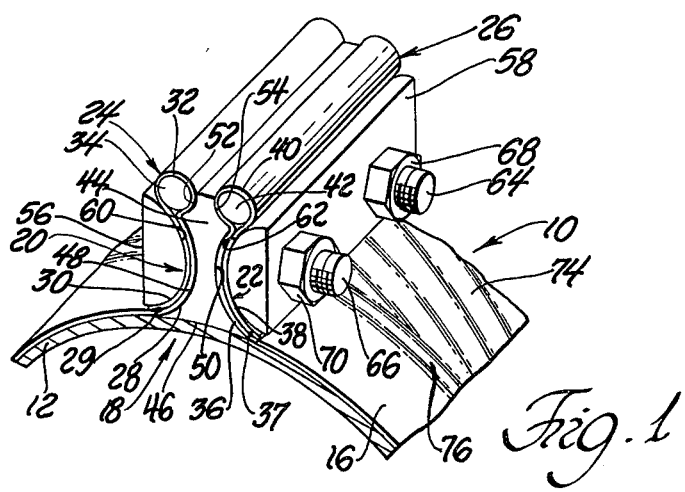
FIG. 1 is a prospective view of the pipe coupling of this invention.

Referring now to the drawings, there is shown an illustrative embodiment of the invention in a pipe coupling having an open sleeve which is adapted to sustain a high degree of tensile stress when the coupling is installed. In particular, the invention will be described with reference to an embodiment which is especially adapted for vehicle exhaust systems in which the coupling is constructed of steel. It will be appreciated, however, that the invention is useful in a wide variety of applications.

Figure 2:
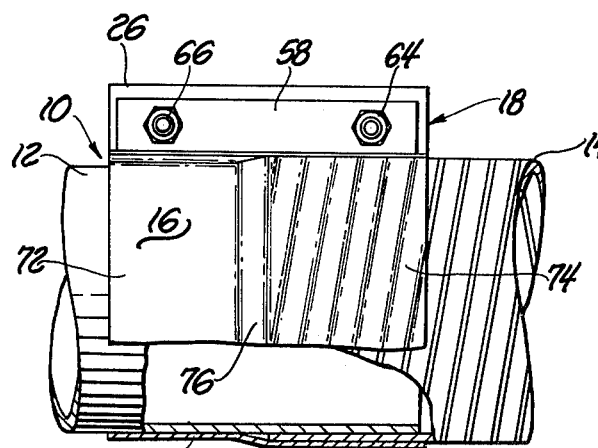
FIG. 2 is an elevation view, with parts broken away, of the coupling of this invention in a pipe lap joint.

Referring now to FIGS. 1 and 2, the coupling comprises a coupling member or sleeve 10 which is adapted to receive a pair of pipes in telescoping relation to form a pipe lap joint with the sleeve stretched around the ends of both pipes. The first pipe 12, in the form of a rigid conduit is joined in a telescoping relation with a second pipe 14 which is a flexible metal pipe. The pipes 12 and 14 are of circular or roundish (such as slightly oval) cross section and are suitably constructed of a ductile material such as cold rolled or stainless steel. The sleeve 10 of the coupling is constructed of a ductile material, preferably a selected grade of sheet steel. It is desirable to use a material which is capable of undergoing a relatively high degree of elongation without failure. For example, aluminized steel is quite satisfactory where the required elongation is relatively small. In other applications, requiring a high degree of elongation stainless steel may be used. A steel known as "Aluma-Ti" available from the Inland Steel Co. exhibits an elongation property intermediate that of aluminized steel and stainless steel and is suitable for many applications.

The sleeve 10 is, for the most part, circular or roundish in cross section. It has a roundish sector 16 and a channel-shaped sector 18 which comprises a pair of sidewalls 20 and 22 extending outwardly from the roundish sector. The sidewall 20 terminates at its outer end in a support or retaining member 24 and the sidewall 22 terminates at its outer end in a support or retaining member 26. The sidewalls 20 and 22 are preferably formed as a double layer of the sheet metal of the sleeve. In sidewall 20, the double layer comprises an inner layer 28 which is a continuation of the roundish sector of the sleeve and an outer layer 30 which is formed by folding the sheet metal of the sleeve back on itself around a loop or bight 32. The bight 32 is preferably circular in cross section and forms a cylindrical passage which receives a cylindrical rod 34. Thus, the retaining member 24 is comprised of the bight 32 and rod 34 and has a thickness greater than that of the sidewall 20. The sidewall 22 is of the same construction as sidewall 20 and comprises an inner layer 36, an outer layer 38, a bight 40 and a rod 42. It is noted that the outer ends of the sidewalls 20 and 22 are separated from each other. The outer layer 30 is secured to the inner layer 28 by a weldment 29, such as plural spot welds spaced over the length of the sidewall along a line at the juncture of the sidewall with the roundish sector 16. Similarly, the outer layer 38 is secured to the inner layer 36 by a weldment 37 along a line at the juncture of the sidewall with the roundish sector.

In order to stretch the sleeve 10 around the pipes 12 and 14, a force applying means is connected with the channel-shaped sector 18. The force applying means comprises a reaction member or spline 44 which is disposed within the channel-shaped sector 18 and which is adapted to seat upon the outer surface of the walls of the pipes 12 and 14. The spline has an inner surface 46 of arcuate configuration conforming to the outer wall of the pipes 12 and 14. This surface of the spline may be provided with a coating of sealing compound if desired to enhance the fluid seal of the coupling. The spline 44 is provided with a pair of oppositely facing concave surfaces 48 and 50. It is also provided with a pair of oppositely facing concave surfaces 52 and 54 which have a radius of approximately the same as that of the bights 32 and 40.

The force applying means also comprises a pair of spacers or bars 56 and 58. The bar 56 has a convex surface 60 which is disposed outside the sidewall 20 opposite the concave surface 48 of the spline 44. Similarly, the bar 58 has a convex surface 62 which is disposed outside the sidewall 22 opposite the concave surface 50 of the spline 44. The convex surfaces 60 and 62 of the bars are preferably a circular arc in cross section with a radius smaller than the radius of the concave surfaces 48 and 50 by an amount approximately equal to the thickness of the sidewalls 20 and 22. The force applying means also includes a pair of bolts 64 and 66 which extend through aligned openings in the bars 56 and 58, sidewalls 20 and 22 and the spline 44. The bolts 64 and 66 are provided with nuts 68 and 70, respectively.

The coupling shown in FIG. 2 is provided with a sleeve in which the roundish sector 16 includes an end band 72 and an end band 74 which are integrally joined with each other at a narrow circumferentially extending shoulder 76. This structure of the sleeve 10 is adapted to accommodate the different diameters of the pipes 12 and 14 in the lap joint so that the sleeve may be stretched into close surface engagement with both pipes. The sleeve 10 may be performed in the roundish sector to provide the end bands 72 and 74 of different diameters by a method set forth in my co-pending patent application Ser. No. 968,229 filed Dec. 11, 1978 entitled "Coupling for Pipe Lap Joints". The complete disclosure of that patent application is hereby incorporated by reference.

Figure 4:
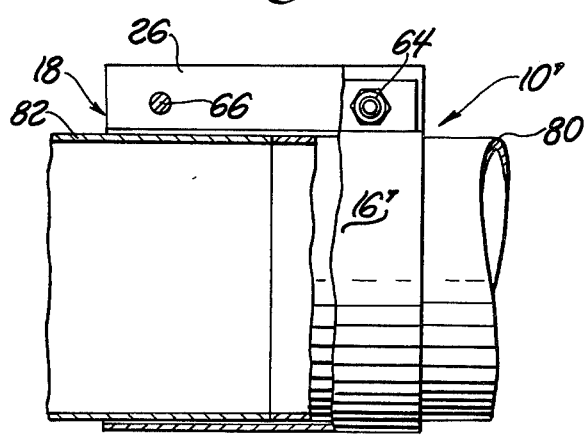
FIG. 4 shows an elevation view, with parts broken away, of the coupling of this invention in a pipe butt joint.

FIG. 4 shows the invention in a pipe coupling for butt joints. The coupling comprises a sleeve 10' which receives a pair of pipes 80 and 82 in abutting relationship. The sleeve 10' comprises a channel-shaped sector 18 and a roundish sector 16'. The channel-shaped sector 18 is of the same construction as shown in FIG. 1. The roundish sector 16 of the sleeve is a cylinder of uniform diameter which accommodates the equal diameter of the pipes 80 and 82.

Figure 3:
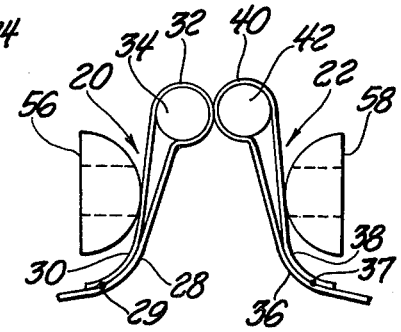
FIG. 3 shows a detail of construction.

As described above, the pipe coupling of FIG. 2 in a lap joint and the pipe coupling in FIG. 4 in a butt joint both comprise the channel-shaped sector and the force applying means as shown in FIG. 1. FIG. 1 shows the coupling in its installed condition, i.e. the bolts are tightened and the sleeve 10 is stretched around the pipes. FIG. 3 shows the channel-shaped sector of the sleeve 10 before it is clamped against the spline 44 between the bars 56 and 58. When the spline 44 is placed between the sidewalls 20 and 22 the bolts 64 and 66 are inserted through the bars, sidewalls and spline and the nuts are applied. This places the coupling in readiness for tightening of the bolts and stretching the sleeve around the pipes.

Figure 5:
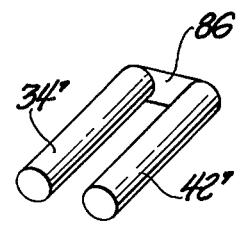
FIG. 5 shows a modification of a part of the pipe coupling.

FIG. 5 shows a modification of the rods for the retaining members 24 and 26. In this modification, the rods 34' and 42' are connected together by a rigid link 86 to form a U-shaped clip. The rods 34' and 42' are inserted into the bights 32 and 40 and serve to hold the sidewalls 20 and 22 in spaced relation during the assembly of the spline, bars and bolts of the force applying means. A pair of retaining clips as shown in FIG. 5 may be used with one being inserted at each and of the sidewalls.

Before the pipe coupling is installed, the parts thereof, namely the sleeve and the force applying means, may be unassembled or may be assembled in loose relationship. In some installations, the pipes may be inserted axially into the sleeve. In other installations it will be necessary to disassemble the bolts, bars and spline and pass the open sleeve laterally over the pipes to be joined. For this purpose, the sidewalls of the channel may be sprung open sufficiently to accommodate the pipe diameters. With the sleeve in place, the coupling is assembled and the bolts are tightened to stretch the sleeve around the pipes. As the bolts are tightened, the sidewalls 20 and 22 are drawn inwardly by the bars 56 and 58 into engagement with the spline 44. This causes the retaining members 24 and 26 to be pulled into engagement with the respective bars 56 and 58 and the spline 44. In particular, the retaining member 24 is seated or trapped against the upper surface of the bar 56 and the concave surface 52 on the spline 44; the retaining member 26 is seated or trapped against the upper surface of the bar 58 and the concave surface 54 of the spline 44. With the retaining members 24 and 26 seated against the bars 56 and 58 and the spline 44, the sleeve is an unstressed condition is of such size relative to the pipes that it must be stretched in order to achieve close engagement with the pipes and the concave surfaces 48 and 50 of the spline 44. It is noted that the concave surfaces 48 and 50 of the spline have a surface configuration which forms a continuation of the outer surfaces of the pipes without abrupt change of direction. Accordingly, tensile force in the sidewalls 20 and 22 may be transmitted to the roundish sector 16 of the sleeve without significant stress concentration. With the retaining means 24 and 26 fixed in the position described, the forces applied by the bars 56 and 58 produce increased tensile stresses in the sidewalls 20 and 22. The sidewalls, as described above, are of double thickness and are stronger in tension than the single thickness roundish sector of the sleeve. The placement of the weldments 29 and 37 at the juncture of the sidewalls with the roundish portion minimizes the loading on the weldments. It is noted that the folded construction of the sidewall layers over the respective rods 34 and 42 causes shear forces to be developed by frictional engagement of the sidewall layers and reduces the loading on the weldments. Further, double layer sidewalls function in the manner of an integral, one piece sidewall of double thickness. This provides augmented strength in the sleeve in the region where the external forces are applied thereto. Accordingly, very large tensile forces may be developed in the sidewalls and transmitted thereby to the roundish sector of the sleeve to stretch it over the pipes. In other words, the high tensile forces in the sidewalls 20 and 22 will be sufficient to produce tensile stresses in the roundish sector 16 of the sleeve which produce the desired elongation or stretching without excessive tensile stresses and stretching of the sidewalls. This provides distribution of stresses in the roundish sector of the sleeve such that all portions thereof are drawn tightly into engagement with the pipes.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a pipe coupling of the type comprising a sleeve adapted to receive one pipe inside one end and another pipe inside the other end, said sleeve having a cross section including a roundish sector and a radially projecting channel shaped sector, force applying means connected with the channel-shaped sector and adapted to act on the sleeve for deforming the sleeve to change the cross sectional dimensions thereof to stretch the sleeve around said pipes, the improvement wherein said channel-shaped sector comprises a pair of sidewalls extending outwardly from the roundish sector and being separated from each other at the outer ends to form an opening in the sleeve, a spline disposed between the sidewalls and having a concave surface opposite each sidewall, a pair of bars each having a convex surface, one bar being disposed against one sidewall opposite one concave surface of the spline and the other bar being disposed against the other sidewall opposite the other concave surface of the spline, each of said sidewalls having a retaining member on the outer edge thereof and disposed outwardly of the spline and the respective bar, said retaining members having a greater thickness than the respective sidewalls, said force applying means including at least one bolt and nut with the bolt extending laterally through the bars, sidewalls and spline and being adapted to draw the bars together and force the sidewalls against the concave surfaces of the spline with said retaining members being trapped against the outer surfaces of the spline and bars whereby the sleeve may be stretched around said pipes.

2. The invention as defined in claim 1 wherein said sidewalls have a thickness greater than that of the roundish portion.

3. The invention as defined in claim 1 wherein said sleeve is formed of sheet material, the roundish portion being a single layer of sheet material and each of the sidewalls being a double layer of sheet material.

4. The invention as defined in claim 1 wherein said sleeve comprises a single piece of sheet material and each of said sidewalls is folded back on itself to provide a double layer of sheet material.

5. The invention as defined in claim 4 wherein said retaining member comprises a rod disposed inside the fold of said sidewall.

6. The invention as defined in claim 5 wherein the rod in one sidewall is connected with the rod in the other sidewall to hold the sidewalls in spaced relation prior to the insertion of said bolt.

7. The invention as defined in claim 4 wherein the two layers of each sidewall are welded together along the juncture of the sidewall with said roundish portion.

8. The invention as defined in claim 1 wherein each of the concave surfaces of said spline are approximately circular arcs and wherein the concave surface of each bar is approximately a circular arc.

9. In a pipe coupling of the type comprising a sleeve adapted to receive one pipe inside one end and another pipe inside the other end, said sleeve having a cross section including a roundish sector and a radially projecting channel-shaped sector, force applying means connected with the channel-shaped sector and adapted to act on the sleeve for deforming the sleeve to change the cross sectional dimensions thereof to stretch the sleeve around said pipes, the improvement wherein said channel-shaped sector comprises a pair of sidewalls extending outwardly from the roundish sector and being separated from each other at the outer ends to form an opening in the sleeve, a spline disposed between the sidewalls and having a pair of surfaces which are respectively opposite said pair of sidewalls, one of said surfaces of said spline being concave, a pair of bars, one bar being disposed against one sidewall opposite said concave surface of the spline and the other bar being disposed against the other sidewall opposite the other surface of the spline, each of said sidewalls having a retaining member adapted to engage the respective bar, said force applying means including at least one bolt and nut with the bolt extending laterally through the bars, sidewalls and spline and being adapted to draw the bars together and force the sidewalls against the respective surfaces of the spline with said retaining members being trapped by the spline and the bars whereby the sleeve may be stretched around said pipes.

10. The invention as defined in claim 9 wherein said sleeve comprises a single piece of sheet material and each said sidewall is folded back on itself to provide a double layer of sheet material.

11. The invention as defined in claim 10 wherein each of said retaining members comprises a rod disposed inside the fold of the respective sidewall.

* * * * *